(12) United States Patent
Roe et al.

(10) Patent No.: US 7,515,257 B1
(45) Date of Patent: Apr. 7, 2009

(54) SHORT-RANGE/LONG-RANGE INTEGRATED TARGET (SLIT) FOR VIDEO GUIDANCE SENSOR RENDEZVOUS AND DOCKING

(75) Inventors: Fred D. Roe, Huntsville, AL (US); Thomas C. Bryan, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 904 days.

(21) Appl. No.: 11/014,455

(22) Filed: Dec. 15, 2004

(51) Int. Cl.
*G01B 11/26* (2006.01)

(52) U.S. Cl. ............ 356/152.3; 356/152.2; 356/139.03; 356/139.07; 356/139.1; 356/141.1

(58) Field of Classification Search ....... 356/3.01–3.15, 356/4.01–4.1, 5.01–5.15, 6–22, 152.1–152.3, 356/139.03, 139.07–139.1, 141.1
See application file for complete search history.

(56) References Cited

U.S. PATENT DOCUMENTS 4,123,165 A * 10/1978 Brown et al. ........... 356/139.03
5,207,003 A * 5/1993 Yamada et al. ............... 33/293
5,493,392 A   2/1996 Blackmon et al.
5,530,650 A   6/1996 Biferno et al.
6,721,054 B1 * 4/2004 Spooner ..................... 356/445

OTHER PUBLICATIONS

Roe, F.D. and Howard, R.T., The Successful Development of an Automated Rendezvous and Capture (AR&C) System for the National Aeronautics and Space.
Roe, F.D., Howard, R.T. and Murphy. L., Automated Rendezvous and Capture System Development and Simulation for NASA.

\* cited by examiner

*Primary Examiner*—Thomas H Tarcza
*Assistant Examiner*—Luke D Ratcliffe
(74) *Attorney, Agent, or Firm*—James J. McGroary

(57) ABSTRACT

A laser target reflector assembly for mounting upon spacecraft having a long-range reflector array formed from a plurality of unfiltered light reflectors embedded in an array pattern upon a hemispherical reflector disposed upon a mounting plate. The reflector assembly also includes a short-range reflector array positioned upon the mounting body proximate to the long-range reflector array. The short-range reflector array includes three filtered light reflectors positioned upon extensions from the mounting body. The three filtered light reflectors retro-reflect substantially all incident light rays that are transmissive by their monochromatic filters and received by the three filtered light reflectors. In one embodiment the short-range reflector array is embedded within the hemispherical reflector.

19 Claims, 3 Drawing Sheets

US 7,515,257 B1

SHORT-RANGE/LONG-RANGE INTEGRATED TARGET (SLIT) FOR VIDEO GUIDANCE SENSOR RENDEZVOUS AND DOCKING

ORIGIN OF INVENTION

The invention described herein was made by employees of the United States Government and may be manufactured and used by or for the Government of the United States of America for governmental purposes without the payment of any royalties thereon or therefore.

BACKGROUND OF THE INVENTION

The present invention relates generally to targets for light detection and ranging ("LIDAR") systems. More particularly, this invention pertains to laser targets for laser guidance sensors used in rendezvous, docking and station keeping of mobile vehicles such as spacecraft. Even more particularly, this invention pertains to short range and long range laser targets used with advanced video guidance sensors ("AVGS") employed in rendezvousing, docking and station keeping of mobile vehicles, such as spacecraft.

One AVGS known in the prior art enables a chase (active) vehicle and a target (passive) vehicle to rendezvous and dock with only the automatic piloting of the chase vehicle. When the AVGS operates in a 'range and bearing' mode, the AVGS on the chase vehicle searches for and illuminates two hemispherical long range laser targets attached to the target vehicle. The AVGS then detects the resulting reflected laser light and determines a range and bearing from the chase vehicle to the target vehicle.

When controlling docking or short range station keeping maneuvers, the AVGS shifts to tracking a separate three-point reflective docking target (short range docking target) mounted to the target vehicle. This short range docking target may be mounted away from the long range hemispherical laser target. A visual tracking sensor, such as a monochrome video camera, on the chase vehicle is used to detect the returns of the various laser targets and produce a video image of the detections. Software driven differential imaging techniques are used in determining the relative position and attitude of the vehicles.

Current reflector art used with the AVGS teach separate long range and short range arrays. Where this art is practiced on spacecraft such as the International Space Station ("ISS"), the need for multiple laser targets contributes to the potential confusion of laser targeting sensors such as the AVGS. The AVGS must 'swap' targeted arrays when handing off between long range and short range arrays. This requires searching for the short range sensor in an area of the processed detection image that is different than the area already identified as containing the reflections of the long range array. Also, additional hemispherical reflectors are needed for rangefinder style proximity sensors used for approaching and maneuvering around the ISS. These multiple reflectors arrays result in: additional sensor confusion; greater expenditures to design, build, transport and mount such arrays on the ISS; a greater number of astronaut extravehicular activities ("EVA" or 'space walk'). For spacecraft not yet in orbit, this approach of using multiple reflectors arrays results in: more spacecraft surface area dedicated to the mounting the reflector arrays; greater spacecraft weight and greater spacecraft cost.

What is needed then, is a novel reflector assembly that can support rangefinders, AVGS long range tracking, and AVGS short range tracking from the beginning of a long range rendezvous approach through to final spacecraft docking.

Other features and advantages of the invention will be set forth in, or apparent from, the following detailed description of preferred embodiments of the invention.

BRIEF SUMMARY OF THE INVENTION

A laser target reflector assembly for mounting upon mobile vehicles, such as spacecraft, is disclosed and includes both long-range and short-range reflector arrays disposed upon a mounting plate. A plurality of unfiltered light reflectors are embedded in an array upon a hemispherical reflector to form the long-range reflector array. A short-range reflector array is positioned upon the mounting body proximate to the long-range reflector array and includes three filtered light reflectors which are positioned upon extensions from the mounting body. In one embodiment the short-range reflector array is embedded within the hemispherical reflector.

The unfiltered light reflectors of the long-range reflector array are arranged in a regularly distributed geometric pattern and are positioned such that at least one of the unfiltered light reflectors will retro-reflect substantially all incident light rays received by the long-range reflector array from between 0 degrees and approximately 360 degrees in azimuth and between approximately 0 degrees and approximately 90 degrees in elevation relative to the long-range reflector array.

The three filtered light reflectors form the short-range reflector array and retro-reflect substantially all incident light rays that are transmissive by their monochromatic filters and received by the three filtered light reflectors from between 0 degrees and 30 degrees out of the approach plane relative to the short-range reflector array.

DETAILED DESCRIPTION OF THE INVENTION

Figure 1:
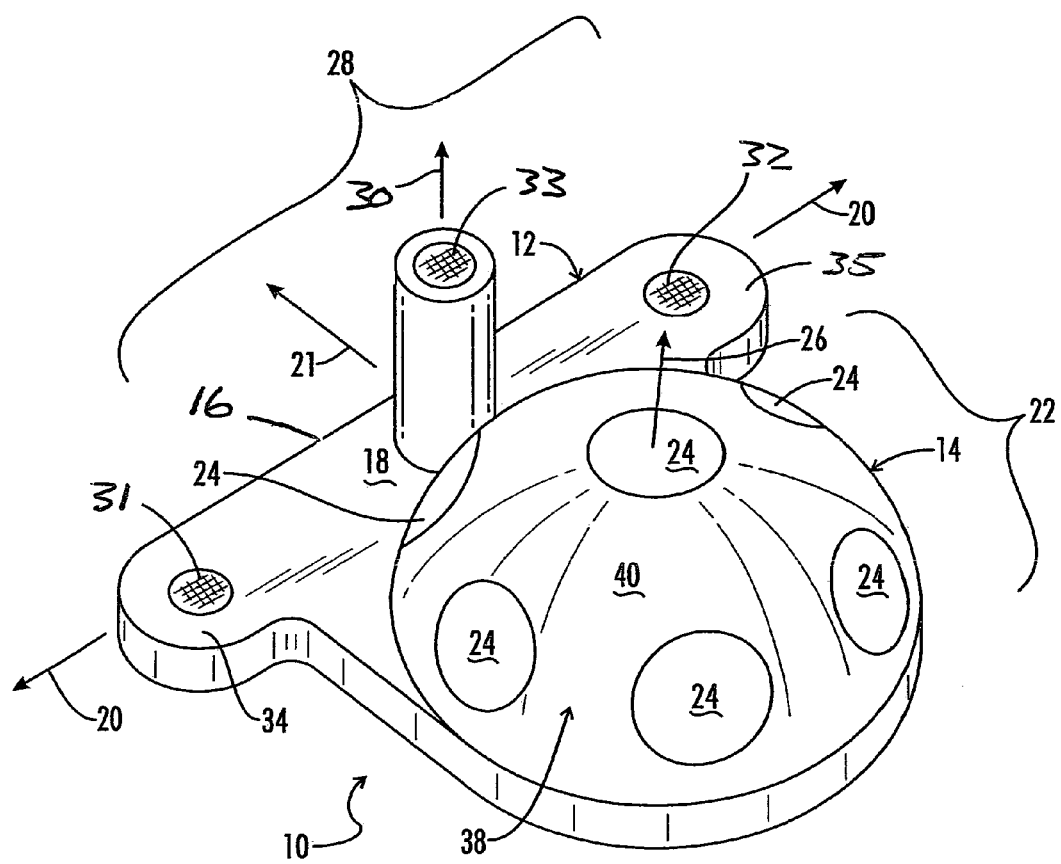
FIG. 1 is an oblique view of an embodiment of the invention having the upper filtered retro-reflector positioned at a greater height than the hemispherical body.

Referring now to FIG. 1, a reflector assembly (10) suitable as a reflective target for laser guidance sensors used in rendezvous, docking and station keeping of mobile vehicles such as spacecraft is shown as one embodiment of the present invention. The reflector assembly (10) of FIG. 1 includes: a mounting body (12); a long-range reflector array (22); and a short-range reflector array (28).

In this embodiment, the mounting body (12) includes a plate (16) adapted for mounting up on a target vehicle. The upper surface (18) of the plate is used as a reference surface to define a first horizon plane axis (20) and a second horizon plane axis (21), as shown in FIG. 1. Together, the first horizon plane axis (20) and the second horizon plane axis (21) define a horizon plane. The upper surface (18) of the plate is used for convenience as one reference to define relative geometric coordinates for use by laser guidance sensors and vehicle control systems in rendezvousing, docking and station keeping. Other features of this and other embodiments of the present invention may be used as topographical references separate from or in combination with the upper surface (18) of the plate or any other convenient structure.

A long-range reflector array (22) is disposed upon the mounting body (12) and includes a plurality of unfiltered light reflectors (24). In this embodiment the long-range reflector array (22) is a hemispherical reflector (38). The plurality of unfiltered light reflectors (24) are embedded upon the hemispherical surface (40) in an array that ensures reflection of an illuminating laser light incident from any direction above the horizon plane. The hemispherical shape of this reflector is generally considered desirable for use in long range reflector arrays, but this invention also anticipates use of reflectors having other shapes which may be substituted for the hemispherical reflector without substantially changing the function of the invention. For example, on aircraft it may be necessary to have long range reflector array coverage of only a quadrant of space from the target vehicle. Thus, a long range reflector array shaped in a spherical quadrant or similar form may be substituted for the hemispherical reflector (38) in an embodiment of the invention used on aircraft.

The hemispherical reflector (38) shown in FIG. 1 necessarily has a geometric pole (26) atop the hemispherical reflector surface (40). FIG. 1 further shows a reference (polar) axis (26) extending from the geometric hemispherical pole. For the purposes of this paper, the reference axis (26) and the horizon plane are used to describe the geometric coordinates (azimuth and elevation) relative to the reflector assembly (10).

As shown in FIG. 1, the reflector assembly (10) further includes a short-range reflector array (28) positioned upon the mounting body (12) proximate to the long-range reflector array (22). In this embodiment the short-range reflector array (28) includes three filtered light reflectors (31, 32, 33) which are positioned upon extensions (34, 35) from the mounting body (12). The three filtered light reflectors (31, 32, 33) are positioned so as to define a first approach plane axis (30), which is the normal to the horizon plane, and to further define a second approach line axis (20) through two of the three filtered light reflectors (31, 32, 33). Together the first and second approach plane axes (30 and 20) define an approach plane for reference in use of the short-range reflector array (28) by a laser ranging means (not shown).

In various embodiments of the present invention, retro-reflectors are used for both the unfiltered light reflectors (24) and the filtered light reflectors (31, 32, 33). In the embodiment shown in FIG. 1, the unfiltered light reflectors (24) are unfiltered corner cube reflectors and the filtered light reflectors (31, 32, 33) are corner cube reflectors having monochromatic filters placed within the light apertures of the reflectors. One skilled in the art would recognize that various short-range target reflectors and long-range target reflectors can be substituted for the corner cube reflectors. In particular suitable target reflectors include reflective tape, mirrored disk, unfiltered retro-reflectors, filtered retro-reflectors, unfiltered corner cube reflectors and filtered corner cube reflectors.

Referring again to FIG. 1, the unfiltered light reflectors (24) of the long-range reflector array (22) of this embodiment are arranged in a regularly distributed geometric pattern and are positioned such that at least one of the unfiltered light reflectors (24) will retro-reflect substantially all incident light rays received by the long-range reflector array (22) from between approximately 0 degrees and approximately 360 degrees in azimuth and between approximately 0 degrees and approximately 90 degrees in elevation, relative to the reference axis (26) and the horizon plane.

Figure 2:
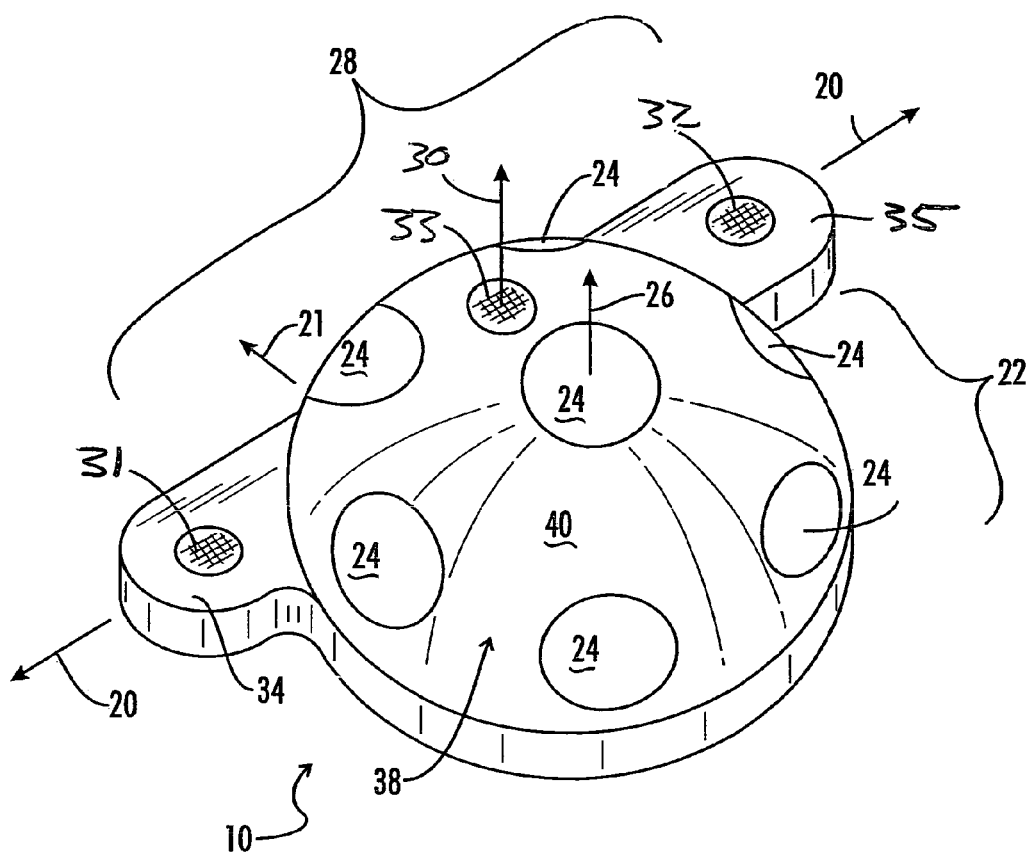
FIG. 2 is an oblique view of a second embodiment of the invention having the upper filtered retro-reflector positioned atop the hemispherical body.
Figure 3:
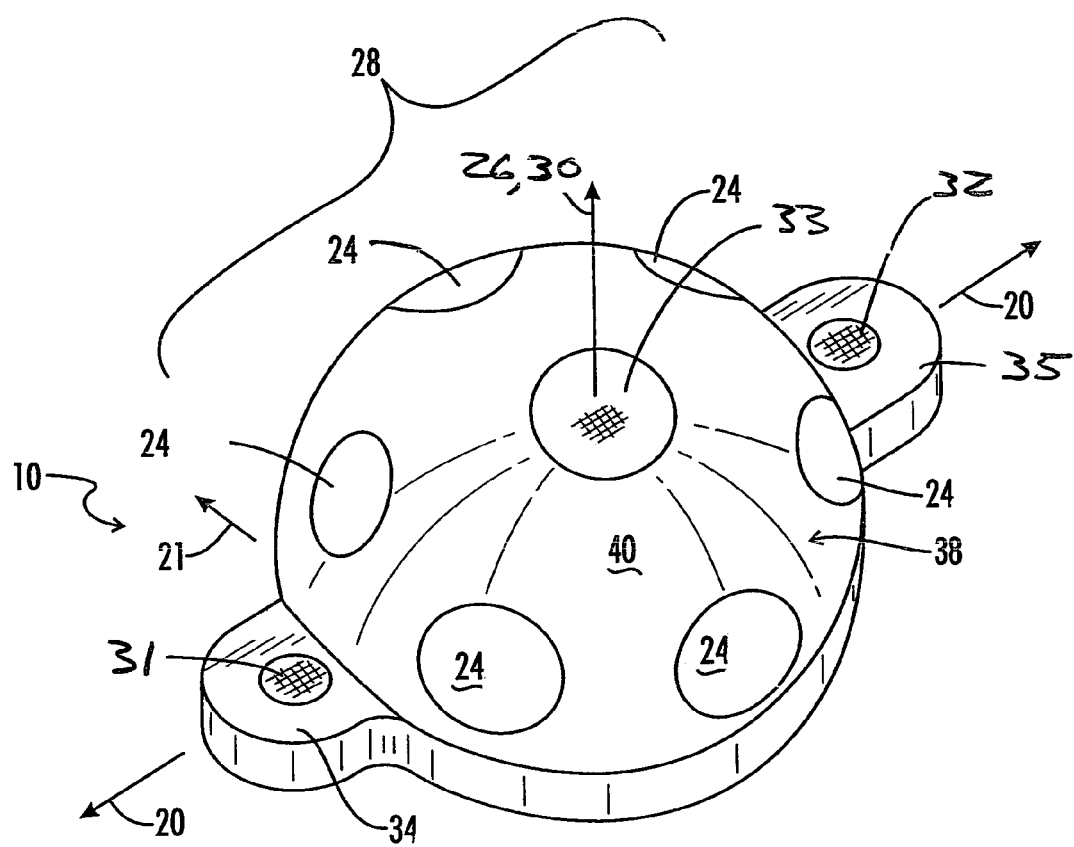
FIG. 3 is an oblique view of a third embodiment of the invention having the upper filtered retro-reflector and an unfiltered retro-reflector positioned atop the hemispherical body.

FIG. 1 further shows a first and a second plate extension (34, 35) disposed proximate to the plate (16) and proximate to the hemispherical reflector (38). In this embodiment of the present invention, each plate extension (34, 35) has a surface approximate to and parallel to the horizon plane. Two of the three filtered light reflectors (31, 32) are positioned upon the plate extensions (34, 35) and the third filtered light reflector (33) is positioned between and above the first and second plate extensions (34, 35). In this configuration the three filtered light reflectors (31, 32, 33) are referred to as the upper filtered light reflector (33) and the first and second lower filtered light reflectors (31, 32). The upper filtered light reflector (33) is displaced a distance approximately equal to the radius of the hemisphere above the first and second lower filtered light reflectors (31, 32). One skilled in the art would recognize the configuration of filtered light reflectors (31, 32, 33) shown in FIG. 1 as being one of many configurations suitable for use as the short-range reflector array (28) of the present invention. Referring to FIGS. 2 and 3, alternate embodiments having a similar configuration of filtered light reflectors (31, 32, 33) are shown and further described below. Yet other embodiments use configurations reversing the vertical positioning of the three filtered light reflectors (31, 32, 33). Still yet other embodiments position the third filtered light reflector (33) above (or below) but not in alignment with the first and second plate extensions (34, 35).

The three filtered light reflectors (31, 32, 33) that form the short-range reflector array (28) shown in FIG. 1 are disposed in a configuration such that each of the three filtered light reflectors (31, 32, 33) will retro-reflect substantially all incident light rays that are transmissive by the monochromatic filters and received by the three filtered light reflectors (31, 32, 33) from between approximately 0 degrees and approximately 30 degrees out of the approach plane relative to the short-range reflector array (28).

In one operational use, the reflector assembly (10) shown in FIG. 1 is attached to a passive (target) spacecraft for tracking by a laser tracking device such as an automated vehicle guidance sensor (AVGS) used on an active (chase) spacecraft for rendezvous, docking and station keeping. Where rendezvous or long distance station keeping between the target and chase spacecraft is desired, the AVGS operates in a 'range and bearing' mode. With the target and chase spacecraft separated by distance of between approximately 10,000 meters and approximately 10 meters and the AVGS operating in a 'range and bearing' mode, the AVGS first illuminates the reflector assembly (10) with a laser light having a first or second wave length. The unfiltered light reflectors (24) of the long-range reflectors array (22) operate to retro-reflect any light rays so received from the AVGS. The AVGS then detects the resulting reflected laser light with a laser light sensor such as a CCD sensor. From the ranging data received, the AVGS determines a range and bearing from the chase spacecraft to the target spacecraft. The AVGS repeats this process as necessary to monitor range and bearing and rates of change in range and bearing during rendezvous or long distance station keeping.

Where docking or short distance station keeping between the target and chase spacecraft is desired, the AVGS operates in a tracking mode. With the target and chase spacecraft separated by distance of between approximately 1000 meters and approximately 0.5 meters, the AVGS operates in a tracking mode to determine the relative position coordinates (x, y and z coordinates) and the pitch, roll and yaw status of the target spacecraft based upon the known fixed geometric dimensions of the short range target array and of the two spacecraft and upon the relative appearance of the detected returns of the short range target array. At these short ranges, various surfaces of the target spacecraft may provide interfering background light returns. The filtered retro-reflectors (31, 32, 33) of the short range target array (28) enables the AVGS to use differential imaging techniques to separate the light returns of the short range target array (28) from background returns. The AVGS takes two images of the reflector assembly (10) and differentially compares the two images to produce a third image of the short range target array (28). The first image is taken by first illuminating the reflector assembly (10) with a laser operating at a first wave length. The filtered light reflectors (24) of the short-range reflectors array (28) operate to retro-reflect any such light rays having the first wave length and received from the AVGS. The AVGS then detects and images the resulting reflected laser light and any incidental background light, including light incidentally retro-reflected by unfiltered light reflectors (24). The second image is then taken by illuminating the reflector assembly (10) with a second laser operating at a second wave length. The filtered light reflectors (24) of the short-range reflectors array (28) prevent any significant retro-reflection of any such light rays having the second wave length and received from the AVGS. Thus, only background light is detected and imaged by the AVGS. The two images are then differentially compared to remove background interference and the resulting image consists of an image of the filtered light reflectors (31, 32, 33) of the short-range reflector array (28). That image is then analyzed by the AVGS to determine the geometric coordinates and the pitch roll and yaw status of the target spacecraft relative to the chase spacecraft.

In one embodiment, the filtered light reflectors (31, 32, 33) are adapted such that substantially all the incident light rays having a first wave length (e.g., approximately 850 nm) are retro-reflected while substantially all the incident light rays having a second wave length (e.g., approximately 800 nm) are substantially prevented from being reflected by the monochromatic filters. One skilled in the art would recognize that the monochromatic filters of the filtered light reflectors (31, 32, 33) may be selected such that any desirable wave length of laser light may be filtered. Thus, various laser tracking systems having lasers operating at numerous combinations of selected wave lengths within the visible, infra-red, or ultraviolet light frequencies may be operable with the reflector assembly (10) of the present invention.

Referring now to FIG. 2, a second embodiment of the invention is shown having the upper filtered light reflector (33) disposed atop of the hemispherical reflector (38). Additionally, base extensions (34, 35) are shown proximate to the hemispherical reflector (38) and having the first and second lower filtered light reflectors (31, 32) disposed thereon. This embodiment is even more compact than the embodiment of FIG. 1 and is simpler in design.

Referring now to FIG. 3, a third embodiment of the invention is shown in which the upper filtered light reflector (33) is set directly atop the hemispherical reflector (38) and replaces the upper most unfiltered light reflector (24) of the long-range reflector ray. This embodiment allows for a larger filtered corner cube reflector to be used in the short-range reflector (28). Where the long-range laser tracking device utilizes a first wave length that is transmissible by the filtered light reflectors (31, 32, 33), this embodiment will have no degradation of the performance of the long-range reflector array since the upper filtered light reflector (33) will act substantially the same as the unfiltered light reflector (24) which it replaced.

Either of the embodiments shown in FIG. 2 or 3 may be readily modified into alternate embodiments of the present invention by substitution of two cavities in the hemispherical surface for the two base extensions (34, 35) shown. The first and second lower filtered light reflectors (31, 32) are then disposed within the cavities. The resulting reflector assembly of these alternate embodiments has a foot print (mounting plate) no larger than the hemispherical reflector while housing a short-range targeting array within at long-range targeting array. Furthermore, rather than using unfiltered light reflectors in the long-range reflector array and filtered light reflectors in the short-range reflector array, an alternative embodiment could use filtered light reflectors in the long-range reflector array and unfiltered light reflectors in the short-range reflector array.

Thus, although there have been described particular embodiments of the present invention of a new and useful Short-range/Long-range Integrated Target (SLIT) for Video Guidance Sensor Rendezvous and Docking, it is not intended that such references be construed as limitations upon the scope of this invention except as set forth in the following claims.

What is claimed is:

1. A reflector assembly comprising:
    a mounting body having a plate adapted for mounting upon a target and a hemispherical reflector having a hemispherical reflector surface disposed upon the plate, the plate having a reference surface defining a horizon plane and first, second, and third extensions having first, second, and third plate extension surfaces respectively, each plate extension proximate to the hemispherical reflector;
    a long range reflector array disposed upon the mounting body and comprising a plurality of unfiltered light reflectors, the long range reflector array having a reference axis extending above and normal to the horizon plane, the long range reflector array further comprising at least one unfiltered light reflector disposed upon the hemispherical reflector surface; and
    a short range reflector array disposed proximate to the long range reflector array and comprising three filtered light reflectors defining an approach plane generally normal to the horizon plane, the three filtered light reflectors comprising an upper filtered light reflector disposed on the first plate extension surface above the second and third plate extension surfaces, and two lower filtered light reflectors disposed on the second and third plate extension surfaces.

2. The apparatus of claim 1, wherein at least one of said unfiltered light reflectors or said filtered light reflectors comprises a retro-reflector.

3. A reflector assembly comprising:
    a mounting body having a plate adapted for mounting upon a target, the plate having a reference surface defining a horizon plane, the mounting body comprising a hemispherical reflector disposed upon the plate, the hemispherical reflector having a hemispherical reflector surface;
    a long range reflector array disposed upon the mounting body and comprising a plurality of unfiltered light reflectors, the long range reflector array having a reference axis extending above and normal to the horizon plane, the long range reflector array further comprising at least one unfiltered light reflector disposed upon the hemispherical reflector surface; and
    a short range reflector array disposed proximate to the long range reflector array and comprising three filtered light reflectors defining an approach plane generally normal to the horizon plane, the three filtered light reflectors comprising an upper filtered light reflector disposed upon the hemispherical reflector surface at a position between approximately 60 degrees and approximately 90 degrees in elevation; and a first and a second lower filtered light reflectors, each said lower filtered light reflector disposed upon the hemispherical reflector surface at a position between approximately 0 degrees and approximately 30 degrees in elevation.

4. The apparatus of claim 3, wherein the upper filtered light reflector is displaced a distance approximately equal to the radius of the hemispherical reflector above the first and second lower filtered light reflectors.

5. A reflector assembly comprising:
a mounting body having a plate adapted for mounting upon a target, the plate having a reference surface defining a horizon plane, the mounting body comprising a hemispherical reflector disposed upon the plate, the hemispherical reflector having a hemispherical reflector surface, the plate further comprising a first and a second plate extension having a first and a second plate extension surface respectively, each plate extension proximate to the hemispherical reflector, each plate extension surface generally proximate to and parallel to the horizon plane;
a long range reflector array disposed upon the mounting body and comprising a plurality of unfiltered light reflectors, the long range reflector array having a reference axis extending above and normal to the horizon plane, the long range reflector array further comprising at least one unfiltered light reflector disposed upon the hemispherical reflector surface; and
a short range reflector array disposed proximate to the long range reflector array and comprising three filtered light reflectors defining an approach plane generally normal to the horizon plane, the three filtered light reflectors comprising an upper filtered light reflector disposed above the first and the second plate extension surfaces, and a first and a second lower filtered light reflector, each said lower filtered light reflector being disposed upon a plate extension surface.

6. The apparatus of claim 5, wherein the upper filtered light reflector is displaced a distance approximately equal to the radius of the hemispherical reflector above the first and second lower filtered light reflectors.

7. The apparatus of claim 6, wherein the upper filtered light reflector is disposed upon the hemispherical reflector surface at a position between approximately 60 degrees and approximately 90 degrees in elevation.

8. The apparatus of claim 1, wherein said plurality of unfiltered light reflectors are disposed such that substantially all incident light rays received by the long range reflector array from between approximately 0 degrees and approximately 360 degrees in azimuth and between approximately 0 degrees and approximately 90 degrees in elevation relative to the reference axis and horizon plane are reflected by at least one of said plurality of unfiltered light reflectors.

9. The apparatus of claim 1, wherein at least one filtered light reflector is disposed so as to reflect light received by the at least one filtered light reflector from above the horizon plane and between approximately 0 degrees and approximately 30 degrees out of the approach plane.

10. The apparatus of claim 1 wherein at least one unfiltered light reflector is adapted such that substantially all incident light rays having a first wavelength or having a second wavelength and received by the unfiltered light reflector are reflected by the unfiltered light reflector,
wherein, at least one filtered light reflector is adapted such that substantially all incident light rays having a first wavelength and received by the at least one filtered light reflector are reflected by the filtered light reflector, and
wherein, said at least one filtered light reflector is further adapted to prevent reflection of substantially all incident light rays having a second wavelength and received by the at least one filtered light reflector.

11. The apparatus of claim 1, wherein at least one filtered light reflector comprises a monochromatic light filter.

12. A reflector assembly comprising:
a base comprising:
a central portion comprising a hemispherical body having a polar axis extending above the base; and
a first and a second base extension, each first and second base extension disposed adjacent to the central portion;
a short range target array comprising a plurality of short range target reflectors including:
a first and a second short range target reflector, the first and the second short range target reflectors disposed upon the first and second based extensions respectively; and
a third short range target reflector disposed upon the hemispherical body above the first and second short range target reflectors, the third short range target reflector and the first and second short range target reflectors disposed so as to define a short range target plane parallel to the polar axis; and
a long range target array comprising a plurality of long range target reflectors, each long range target reflector disposed upon the hemispherical body.

13. The apparatus of claim 12, the short range target reflectors comprising laser reflectors selected from the group including: reflective tape, mirrored discs, unfiltered retro-reflectors, filtered retro-reflectors, unfiltered corner cube reflectors, and filtered corner-cube reflectors.

14. The apparatus of claim 12, the short range target reflectors comprising filtered corner-cube reflectors, each filtered corner-cube reflector adapted to generally inhibit reflection of light having a first frequency and to generally allow reflection of light having a second frequency.

15. The apparatus of claim 12, the long range target reflectors comprising laser reflectors selected from the group including: reflective tape, mirrored discs, unfiltered retro-reflectors, filtered retro-reflectors, unfiltered corner cube reflectors, and filtered corner-cube reflectors.

16. The apparatus of claim 12, the long range target reflectors comprising unfiltered corner cube reflectors.

17. The apparatus of claim 12, wherein the third short range target reflector is displaced a distance approximately equal to the radius of the hemispherical body above the first and second lower filtered light reflectors.

18. An integrated laser target comprising:
an unfiltered retro-reflector assembly adapted to be detectable by a first laser tracking means, said first laser tracking means being positioned at a range of between approximately 10,000 meters and approximately 10 meters from the unfiltered retro-reflector assembly, said first laser tracking means illuminating the unfiltered retro-reflector assembly with a laser fight and detecting the resulting reflected laser light; and
a filtered retro-reflector assembly proximate to said unfiltered retro-reflector assembly, said filtered retro-reflector assembly adapted to be differentially detectable by a second laser tracking means, said second laser tracking means being positioned at a range of between approximately 1,000 meters and approximately 0.5 meters from the filtered retro-reflector assembly, said second laser tracking means illuminating the filtered retro-reflector assembly with a laser light having a first wavelength and detecting any resulting reflected laser light, and said second laser tracking means illuminating the filtered retro-reflector assembly with a laser light having said second wavelength and detecting any resulting reflected laser light, wherein, the filtered retro-reflector assembly is adapted such that substantially all incident light rays having a first wavelength and received by the filtered retro-reflector assembly are retro-reflected, and wherein, the filtered retro-reflector assembly is adapted to prevent retro-reflection of substantially all incident light rays having a second wavelength and received by the filtered retro-reflector assembly.

19. The apparatus of claim 18, further comprising:

a mounting body receiving said unfiltered retro-reflector assembly and said filtered retro-reflector assembly, the mounting frame defining a horizon plane and defining a reference pole extending above the horizon plane, wherein, said first laser tracking means being further positioned between approximately 0 degrees and approximately 360 degrees in azimuth and between approximately 0 degrees and approximately 90 degrees in elevation relative to the unfiltered retro-reflector assembly, and wherein, said second laser tracking means being further positioned between approximately 0 degrees and approximately 360 degrees in azimuth and between approximately 45 degrees and approximately 90 degrees in elevation relative to the filtered retro-reflector assembly.

* * * * *